US011609941B2

(12) United States Patent
Folland et al.

(10) Patent No.: US 11,609,941 B2
(45) Date of Patent: Mar. 21, 2023

(54) NATURAL LANGUAGE INTERFACE FOR A DATA MANAGEMENT SYSTEM

(71) Applicant: British Gas Trading Limited, Winsdor (GB)

(72) Inventors: John Antony Folland, Windsor (GB); Deepak Chandar Govardhan, Windsor (GB); Kaushal Trivedi, Windsor (GB); Ajith Kumar Yadhagiri, Windsor (GB)

(73) Assignee: BRITISH GAS TRADING LIMITED, Windsor (GB)

( * ) Notice: Subject to any disclaimer, the term of this patent is extended or adjusted under 35 U.S.C. 154(b) by 0 days.

(21) Appl. No.: 17/048,109

(22) PCT Filed: Apr. 15, 2019

(86) PCT No.: PCT/GB2019/051072
§ 371 (c)(1),
(2) Date: Oct. 16, 2020

(87) PCT Pub. No.: WO2019/202302
PCT Pub. Date: Oct. 24, 2019

(65) Prior Publication Data
US 2021/0064643 A1 Mar. 4, 2021

(30) Foreign Application Priority Data
Apr. 16, 2018 (GB) ...................................... 1806190

(51) Int. Cl.
*G06F 16/332* (2019.01)
*G06F 16/33* (2019.01)
(Continued)

(52) U.S. Cl.
CPC ........ *G06F 16/3329* (2019.01); *G06F 16/338* (2019.01); *G06F 16/3344* (2019.01);
(Continued)

(58) Field of Classification Search
CPC .................................................. G06F 16/3329
See application file for complete search history.

(56) References Cited

U.S. PATENT DOCUMENTS

2007/0083514 A1* 4/2007 Dettinger ............ G06F 21/6227
2014/0101139 A1* 4/2014 Gemert ............... G06F 16/2471
707/771
(Continued)

FOREIGN PATENT DOCUMENTS

WO 2014/197737 A1 12/2014

OTHER PUBLICATIONS

Great Britain Search Report for GB Application No. 1806190.3, dated Nov. 26, 2018, 5 pages.
(Continued)

*Primary Examiner* — Van H Oberly
(74) *Attorney, Agent, or Firm* — Tucker Ellis LLP; Michael G. Craig

(57) ABSTRACT

A data processing system which includes a data management system located in a first network, the data management system providing operations for modifying data stored by the first data management system, and a natural language processing system for processing natural language messages. The natural language processing system is located outside the first network. The system further comprises an interface application having access to the data management system adapted to: receive one or more natural language messages from a user; forward the natural language messages to the natural language processing system; receive an invocation message from the natural language processing system, the invocation message comprising operation data defining an operation to be performed at the data management system, the operation identified by the natural language processing system based on the natural language messages; and invoke the operation at the data management system based on the operation data.

17 Claims, 12 Drawing Sheets

(51) Int. Cl.
G06F 16/338 (2019.01)
G06F 40/35 (2020.01)
G06F 40/56 (2020.01)
G06N 3/006 (2023.01)

(52) U.S. Cl.
CPC .............. *G06F 40/35* (2020.01); *G06F 40/56* (2020.01); *G06N 3/006* (2013.01)

(56) References Cited

U.S. PATENT DOCUMENTS

| | | | | |
|---|---|---|---|---|
| 2015/0169385 | A1* | 6/2015 | Allen | G06F 9/466 719/328 |
| 2017/0075953 | A1* | 3/2017 | Bozkaya | G06F 16/24522 |
| 2017/0091320 | A1* | 3/2017 | Psota | G06F 16/3337 |
| 2018/0329993 | A1* | 11/2018 | Bedadala | G06F 16/90332 |

OTHER PUBLICATIONS

PCT International Search Report and the Written Opinion of the International Searching Authority to corresponding Great Britain Patent Application No. PCT/GB2019/051072, dated Sep. 30, 2019, 31 pages.
Couhbor, "Replacing the Service Desk with Bots using Amazon Lex and Amazon Connect (Part 1)—Kloud blog," Dec. 18, 2017; retrieved from the internet on Aug. 1, 2019, URL:https://blog.kloud.com.au/2017/12/18/replacing-the-service-desk-with-bots-using-amazon-lex-and-amazon-connect-part-1/., 7 pages.
Couhbor, "Replacing the Service Desk with Bots using Amazon Lex and Amazon Connect (Part 2)—Kloud blog," Dec. 20, 2017; retrieved from the internet on Aug. 1, 2019, URL:https://blog.kloud.com.au/2017/12/20/replacing-the-service-desk-with-bots-using-amazon-lex-and-amazon-connect-part-2/, 9 pages.
Couhbor, "Replacing the Service Desk with Bots using Amazon Lex and Amazon Connect (Part 3)—Kloud blog," Jan. 9, 2018; retrieved from the internet on Aug. 1, 2019, URL:https://blog.kloud.com.au/2018/01/09/replacing-the-service-desk-with-bots-using-amazon-lex-and-amazon-connect-part-3/, 8 pages.
Couhbor, "Replacing the Service Desk with Bots using Amazon Lex and Amazon Connect (Part 4)—Kloud blog," Jan. 23, 2018; retrieved from the internet on Aug. 1, 2019, URL:https://blog.kloud.com.au/2018/01/23/replacing-the-service-desk-with-bots-using-amazon-lex-and-amazon-connect-part-4/.
Anbazhagan, "BDA306 NeEW LAUNCH! An Introduction to Amazon Lex, your service for building voice and text chatbots," Apr. 20, 2017; retrieved from the internet on Aug. 1, 2019, URL:https://www.slidesahre.net/AmazonWebServices/bda306-new-launch-an-introduction-to-amazon-lex-your-service-for-building-voice-and-text-chatbots, 6 pages.
Liu, "Pibot—README.MD," Jul. 18, 2017; retrieved from the internet on Aug. 1, 2019, URL:https://bitbucket.org/adppibot/pibot/src/master/, 6 pages.
Klimenko, et al., "Creating a Call-Center Bot with AWS Connect and Amazon Lex: It Can Speak, but Does It Understand?", Mar. 7, 2018, retrieved from the internet on Aug. 1, 2019, URL:/https://greenice.net/creating-call-center-bot-aws-connect-amazon-lex-can-speak-understand/, 7pages.
European Search Report for related EP Application No. 19 718 922.8, dated Jul. 4, 2022, 10 pages.
"Virtual private cloud," Wikipedia, dated Jun. 27, 2022, 16:58, 2 pages. Retrieved from the Internet <URL: https://en.wikipedia.org/w/index.php?title=Virtual_private_cloud&oldid=833201734>.

* cited by examiner

NATURAL LANGUAGE INTERFACE FOR A DATA MANAGEMENT SYSTEM

CROSS-REFERENCE TO RELATED APPLICATIONS

This application is a national phase application of International Application No PCT/GB2019/051072, filed Apr. 15, 2019, which claims priority to Great Britain Patent Application Serial No. 1806190.3, filed Apr. 16, 2018, all of which are incorporated herein by reference.

BACKGROUND

Conventional data management systems, such as customer relationship management (CRM) systems, generally require users (e.g. call centre agents) to navigate through a variety of complex data input screens, based on various predefined workflows, and supply the correct data at each step of the process. The complexity of such processes can result in data errors and low user satisfaction.

"Chatbot" services can provide conversational interfaces that allow users to communicate with applications using natural language either via voice or text. In modern systems of this type, the natural language understanding and speech recognition is powered by deep learning artificial intelligence technologies.

A chatbot service takes the natural language speech or text and identifies the intent behind the input. Once the intent is identified, the service will typically try to extract the data required to fulfil the intent and will prompt the user to provide any missing data. Once all the data items have been received, the chatbot service then fulfils the intent by calling the corresponding function or service of an underlying computer system, such as a CRM or other data management system.

Some examples of chatbot services include Amazon Lex, Microsoft Azure BOT Service, IBM Watson and Google DialogFlow (aka api.ai).

However, the use of the above AI-based chatbot services, which are generally cloud-based, typically requires that the relevant data management systems, business functions or APIs should be accessible from the cloud based services, and that the organisation's data (including e.g. sensitive customer data) must flow through the cloud services backbone. In many real-life applications these requirements cannot be fulfilled due to infrastructure limitations (e.g. business functions cannot be securely accessed from the public Internet) or regulatory limitations (e.g. the data involved is sensitive and may not be passed to the cloud services).

Embodiments of the invention therefore seek to provide alternative approaches for integrating (typically external) natural language processing systems into an organisation's data management systems.

SUMMARY

Accordingly, in a first aspect of the invention, there is provided a data processing system comprising: a data management system located in a first network, the data management system providing operations for modifying data stored by the data management system; and a natural language processing system for processing natural language messages used for invoking operations of the data management system; wherein the natural language processing system is located outside the first network; the data processing system further comprising: an interface application having access to the data management system, the interface application adapted to: receive one or more natural language messages from a user; forward the natural language messages to the natural language processing system for processing; receive an invocation message from the natural language processing system, the invocation message comprising operation data defining an operation to be performed at the data management system, the operation identified by the natural language processing system based on the one or more natural language messages; and invoke the operation at the data management system based on the operation data.

This allows the natural language processing system to invoke operations at the data management system indirectly, by supplying operation data defining an operation to be performed in a message sent in response to (or as part of) a natural language exchange being processed by the natural language processing system. Thus, the invocation message may be formatted as a standard message in an exchange between the interface application and the natural language processing system for processing and responding to natural language messages. Preferably, the natural language processing system is not able to invoke the operation specified in the invocation message—or a plurality of such operations that are specifiable in invocation messages—directly. Thus, there may be a set of operations which the natural language processing system is not able to invoke directly (e.g. via direct API calls to the data management system), but which it can invoke indirectly by signalling the required operation in a message to the interface application as part of the messaging exchange for the purpose natural language message processing. In some cases, the natural language processing system is not able to invoke any operation of the data management system directly, e.g. due to not having access to the data management system or its API(s).

Preferably, the natural language processing system is arranged to identify one of a plurality of predefined intents for a natural language exchange comprising the one or more natural language messages, wherein the operation to be performed is determined based on the identified intent. The intent preferably indicates a particular user intention concerning what the user wishes to achieve through the natural language exchange—i.e. typically the intent indicates a specific type of operation the user wishes to perform in the data management system.

The natural language processing system is preferably arranged to identify one or more parameters for the operation based on the natural language message(s). These may correspond to slots associated with the intent, i.e. data items that should be acquired by the natural language system to enable the intent to be fulfilled (e.g. the relevant operation to be carried out). The parameters may be identified from a single message or through an exchange of multiple natural language messages (e.g. by the natural language processing system questioning the user to acquire parameters that have not been specified in an initial message).

The operation data preferably comprises an identifier of the operation or of an intent corresponding to the operation, and optionally one or more operation parameters, the identifier and parameters having been inserted in the invocation message by the natural language processing system based on the natural language message(s).

The interface application is preferably arranged to run (on a computing device) within the first network. The interface application is preferably arranged to communicate with the natural language processing system via a second network. The first network is a preferably a private network and the second network preferably comprises a public network, such as the Internet. The interface application is preferably able to access the data management system and/or its API(s) directly via the first network.

The natural language processing system may comprise a cloud-based chatbot service, optionally Amazon Lex.

Preferably, the interface application is arranged to receive a request message from the natural language processing system, the request message comprising a payload with request data defining data to be obtained from the data management system, the interface application arranged to acquire requested data from the data management system based on the request data, and to transmit a response message to the natural language processing system having a payload containing the requested data.

Preferably, no natural language output is generated at the interface application responsive to the request message. The request and/or response message are preferably formatted in accordance with a standard message format of the natural language processing system but preferably contain no natural language content to be processed by the natural language system or output to a user.

The request message may be generated by a validation function defined in the natural language processing system, the validation function adapted to validate operation parameters supplied via the natural language message(s), and wherein the requested data is used by the validation function for validating the operation parameters. The invocation message may be generated by a fulfilment function defined in the natural language processing system. The natural language processing system may be arranged to invoke the fulfilment function after identifying required operation parameters through the natural language exchange, preferably wherein the required operation parameters correspond to slots of an intent identified from the natural language messages by the natural language processing system, the intent corresponding to the operation.

Preferably, the interface application is arranged to forward a natural language message received from a user as a formatted message, and to include context data in a payload of the formatted message. The natural language processing system is preferably arranged to use the context data for validating operation parameters obtained from the natural language message(s) and/or generating the invocation message. The context data may include a record identifier for a data record to which the operation pertains, optionally a customer identifier.

Preferably, the system is adapted to encrypt data in a payload of one or more of: the formatted natural language message(s), the invocation message, the request message, and the response message, the encrypted data optionally including context data supplied by the interface application and/or requested data obtained and sent by the interface application responsive to a request message from the natural language processing system. The encrypted data is preferably decryptable only by one or more custom functions added to the natural language processing system for processing natural language exchanges relating to the data management system, and is not decryptable by other parts of the natural language processing system. The one or more custom functions are preferably provided by an operator of the data management system, and/or are configured to have access to a decryption key used for decrypting the encrypted data. The custom functions may comprise a validation function for validating an intent and/or a fulfilment function for fulfilling an intent. The encryption is preferably applied only to a subset of the message(s) and preferably not to any natural language content of the message(s), and/or may be separate from and additional to a second encryption applied to the message(s) for transport over a network (e.g. when transmitted using HTTPS/SSL/TLS).

Preferably, the payload(s) of the formatted messages, request message, response message and/or invocation messages are separate from any natural language content of said message(s) intended for processing by or generated by the natural language processing system, optionally wherein the payload comprises one or more custom attribute(s) or session attribute(s) of said message(s).

The interface application may further be arranged to prevent sensitive information from being transmitted to the natural language processing system. The interface application may be arranged to identify an item of potentially sensitive information, for example an account identifier, in a natural language message received from a user, and to prevent transmission of the message to the natural language processing system or to remove the information from the natural language message prior to transmission to the natural language processing system.

The system preferably comprises a data management interface application (e.g. for use by a call centre agent or the like) providing a data management interface for enabling a user to interact with the data management system, wherein the interface application is integrated into (or interfaces with) the data management interface application. The data management interface application is then preferably adapted to provide data associated with a currently displayed data record to the interface application as context data for transmission to the natural language processing system (e.g. as context data in a payload of a formatted natural language message as described previously).

Natural language messages may comprise one or both of: text data, and voice (audio) data. Preferably, the interface application comprises a user interface for receiving input of text messages from a user for transmission to the natural language processing system and for outputting text message responses received from the natural language processing system to the user. The interface application preferably embeds the natural language content (e.g. text) in formatted messages for onward transmission and extracts the natural language content from similarly formatted messages received from the natural language processing system. The various messages exchanged between the interface application and natural language processing system may be formatted using a suitable encoding such as JSON.

In a further aspect of the invention (which may be combined with the above aspect), the invention provides a data processing system comprising: a data management system providing operations for modifying data stored by the data management system; a natural language processing system for processing natural language messages used for invoking operations of the data management system; and a natural language interface application adapted to: receive one or more natural language messages from a user relating to a required operation that is to be performed at the data management system; and forward the natural language message(s) to the natural language processing system for processing together with an encrypted data object comprising data associated with the required operation. The natural language processing system is adapted to: process the natural language message(s) to derive operation data defining the required operation; and supply the operation data and the encrypted data object to a processing module. The processing module is arranged to decrypt the encrypted data object and use decrypted data from the data object and the operation data to facilitate implementation of the required operation at the data processing system.

Advantageously, the natural language processing system does not, and is preferably unable to, decrypt the encrypted data object. The processing module may be configured in the natural language processing system or in a cloud environment hosting or connected to the natural language processing system, such that data processed by the processing module, including at least the decrypted data object, is not accessible to the natural language processing system, or other systems of the cloud environment, outside the processing module. The processing module may be arranged to run in a protected processing or network domain, optionally a virtual private cloud, connected to a natural language processing subsystem arranged to process the natural language messages and derive the operation data, such that the decrypted data is accessible only within the protected domain or within the processing module and/or is not accessible by the natural language processing subsystem, optionally wherein decryption uses a key accessible only within the protected domain and/or by the processing module.

Facilitating implementation of the required operation may include validating data and/or invoking an operation at the data management system. Thus, the processing module may comprise a function (e.g. a validation lambda function) configured to validate at least some of the operation data using data from the decrypted data object. Alternatively or additionally, the processing module may comprise a function (e.g. a fulfilment lambda function) configured to communicate with the data management system to invoke the required operation at the data management system, based on the operation data and/or based on data from the decrypted data object. A single function may be provided to provide both validation and fulfilment (invocation of the operation) functionality. Thus the processing module may include a single function or multiple functions adapted to use data from the decrypted data object, e.g. to perform custom processing logic associated with one or more operations.

Preferably, communication with the data management system to invoke the operation bypasses the natural language processing system and/or the natural language interface application, optionally wherein the function (or processing module) is configured to communicate with the data management system to invoke the operation by sending a message (preferably directly) to the data management system specifying the operation to be performed, the message preferably not sent via the natural language processing system or the natural language interface application. Alternatively, communication with the data management system may comprise transmitting operation data specifying the operation to be performed in a message to the natural language interface application and/or via the natural language processing system, the natural language interface application arranged to invoke the operation at the data management system, optionally in accordance with a process as performed by the system of the first aspect of the invention set out above.

The operation data may comprise one or both of: an indication of the operation to be performed; and one or more data attributes defining parameters for the operation.

The natural language interface application may be configured to send a natural language message to the natural language processing system in a formatted message, the formatted message comprising: the natural language message to be processed by the natural language processing system; and the encrypted data object, optionally in the form of an encrypted custom payload of the formatted message. The natural language processing system (and associated processing module) may be provided in a first network (e.g. a cloud environment accessible via a public network) and the data management system and/or natural language interface application may be provided in a second network (e.g. a private network) or in multiple respective second (private) networks.

The system in accordance with this aspect of the invention may additionally comprise any of the features of the system of the first aspect of the invention as set out above.

In a further aspect of the invention (which may be combined with any of the above aspects), there is provided a method performed at a validation function configured in a natural language processing system for validation of data extracted from a natural language exchange by the natural language processing system, the method comprising: receiving a data object comprising the extracted data from the natural language processing system; retrieving additional data from a custom payload of the data object; validating the extracted data using the additional data; and sending a validation response to the natural language processing system in dependence on an outcome of the validation.

The method may comprise receiving an initial data object comprising the extracted data; sending a message to the natural language processing system with a data request included in a custom payload of the message; and receiving the data object with the additional data in response to the message. The method may comprise performing an initial static validation of the extracted data based on the initial data object, and only sending the message, receiving the data object with the additional data, and validating the extracted data using the additional data in response to a successful static validation. The method may comprise decrypting the additional data prior to validating. The message preferably comprises no natural language content for display to a user and/or wherein the data object is received in a response message comprising no natural language content for processing by the natural language processing system.

In a further aspect of the invention (which may be combined with any of the above aspects), there is provided a method performed at a fulfilment function configured in a natural language processing system for fulfilling an intent identified from a natural language exchange, the intent corresponding to a required operation to be performed at a data management system and specified by operation data derived from the natural language exchange by the natural language processing system, the method comprising: receiving the operation data and an encrypted data object from the natural language processing system; decrypting the encrypted data object and retrieving additional data from the decrypted data object; and communicating with the data management system to invoke the required operation based on the operation data and the additional data.

The receiving step may comprise receiving a formatted message comprising the operation data together with the encrypted data object in the form of an encrypted custom payload. The encrypted data object is preferably received and forwarded by the natural language processing system without being decrypted.

The invention also provides a system, optionally as defined previously, adapted to perform any method set out above. More generally, the invention provides a system having means, optionally in the form of one or more processors with associated memory, for performing any method as set out herein.

The invention further provides one or more tangible computer-readable media comprising software code adapted, when executed by one or more data processing devices, to implement any system as described herein or perform any method as described herein.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which: —

DETAILED DESCRIPTION

Overview

Figure 1:
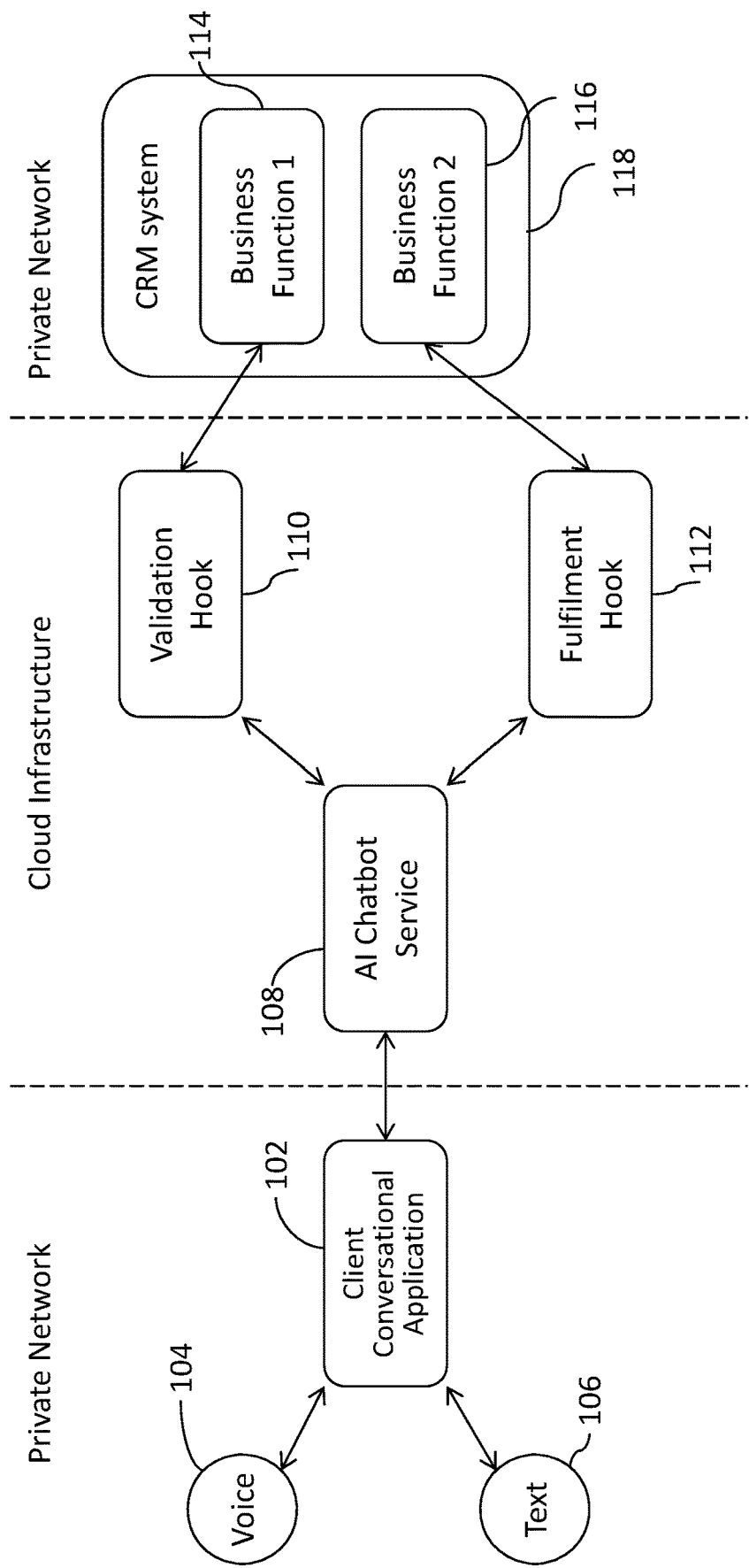
FIG. 1 illustrates one possible system architecture for integrating a cloud-based chatbot service with systems hosted in a private network.

A possible architecture for integrating a third-party natural language processing system, e.g. a cloud-based chatbot service, with data management functions provided within a private network is illustrated in FIG. 1. The architecture is divided into components provided within the private network (e.g. a corporate network) and those provided in the public cloud.

The chatbot service may be used to implement a variety of business functions of a data management system hosted in the private network. As a concrete example, the following illustrates an example workflow for booking an appointment (e.g. a service engineer visit or the like).

Instead of launching an appointment booking screen, the user would just speak to or type into the application: "I would like an appointment."

The chatbot service identifies the intent as BookNewAppointment and prompts the user to provide the date and time.

The user (instead of selecting date and time in an input screen) types (or speaks): "I need one next Thursday at 4 pm."

From this input text/speech, the chatbot service extracts the date and time attributes and passes the same to a custom validation function.

The custom validation function validates the data provided to determine whether it is valid (e.g. the time falls within working hours and an appointment slot is free).

If the data is valid, the chatbot service invokes a business function to register an appointment slot for the user.

These types of chatbot services can be implemented in the architecture depicted in FIG. 1 using the following data flow pattern:

i. A client application 102 provides a voice (104) and/or text (106) interface to a user. The user can talk or type to the client application. In general the client application executes in a controlled environment, for example within a corporate network behind a firewall.

ii. As the client application resides in a controlled environment it has native or trusted connections to the business functions or APIs of the operator's computer systems—in the present case represented as CRM (customer relationship management) system 118.

iii. In order for the client application to understand the speech and natural language provided by the user, it invokes a cloud-based natural language processing (NLP) service (or chatbot service) 108. The AI/NLP capability can be provided by a single service such as Amazon Lex or may be a combination of multiple services such as Microsoft Bot Service combined with Microsoft LUIS and Q&A Maker.

iv. The client application 102 passes the text or voice to the chatbot service 108 along with additional context data items. For example, in order to book an appointment for the customer, the client application may pass a customer's identifier (ID) and additional data to the chatbot service alongside the actual text and voice provided by the user.

v. The chatbot service 108 relies on so-called "hooks" to provide custom business logic to handle user requests. The actual implementation for the hooks varies between cloud platforms, and may include e.g. Lambda functions for Amazon Lex and Azure functions for Azure Bot services. In general the hooks can be classified into validation hooks and fulfilment hooks.

vi. The validation hook 110 is invoked for every user input. Its purpose is to validate the data and intent identified by the AI Chatbot service 108 against application-specific rules. Continuing with our appointment booking example, the chatbot service 108 may extract a requested appointment time of 8 pm from the user messages, which may be outside the business's working hours. Such checks can be coded/configured in the validation hook 110. For some validations, the validation hook may need to invoke some business function/API 114. For example, in order to validate the appointment date and time, the hook could invoke an "isAppoinmentAvailable" business function which checks for appointment availability in the appointment booking system.

vii. Once all the data required for the intent is acquired from the user, the AI chatbot service invokes a fulfilment hook 112 to 'fulfil' the intent. The fulfilment hook calls the necessary business function/API 116 to update/read data in the business system. For our appointment booking example, the fulfilment hook 112 may invoke a "BookNewAppointment" API in the business system passing it the customer data, the appointment date and time. The fulfilment hook returns the success or failure result back to the chatbot service which in turn passes it back to the client application 102.

The above describes a general pattern that could be used across most of the popular Cloud AI chatbot services. For conciseness and clarity, subsequent examples will be described in the context of (and refer to terms and technologies relating to) Amazon Lex. It will be understood, however, that the described approach may be adapted for use with any similar cloud-based natural language processing/chatbot system.

Use of cloud-based AI chatbot services as depicted in FIG. 1 can allow scalable and robust conversational applications to be provided using world class deep learning technologies. As an alternative, developing such technologies from scratch is generally cost prohibitive for most organisations.

However there are certain limitations that are involved in using cloud-based NLP/AI services. In some cases such limitations can become a serious hurdle for organisations wishing to provide conversational interfaces to their users. For example:

- The architecture described above mandates that the business functions/APIs (e.g. CRM system 118) are accessible from the cloud platform. The validation and fulfilment hooks will not be able to function if there is no connectivity between business functions/APIs and cloud platforms. In many cases the business functions and APIs are internal behind a corporate firewall.
- Exposing APIs would also involve building the whole API management capabilities such as identity and access controls, quota management and throttling and prevention of DDoS (distributed denial of service) attacks.
- Even in cases where APIs are available to be called from the public Internet, i.e. they are not locked behind corporate firewalls, calling the APIs from the hooks require the data context to be passed to the cloud-based chatbot service. For example the BookNewAppointment intent might require customer's phone or email address data to be passed to it in order to send an appointment confirmation. In many cases this may not be allowed due to privacy or regulatory reasons.
- Data shared with the cloud AI/NLP services may fall outside the data sharing agreements that the businesses have with the customers. This would make the general design pattern unusable.

Embodiments of the present invention thus provide an alternative approach to implementation of natural language controlled services that enables secure communication between cloud-based NLP/chatbot services and the private systems of the operator ("on-premise applications") even when the on-premise business functions are not reachable via the public network.

To address the limitations mentioned above, whilst still allowing the use of NLP services available via the public Internet (e.g. Amazon Lex/Alexa), disclosed embodiments address the following objectives:

1. The validation hooks are able to receive the data required to perform validation steps (without direct access to business functions/APIs).
2. The fulfilment hooks are able to trigger fulfilment without connecting directly to the business functions/APIs.
3. The context data that is passed through the chatbot service is encrypted so that it cannot be utilised by the cloud provider in any way. The hooks will be able to decrypt and utilise the data according to the business logic.

Figure 2:
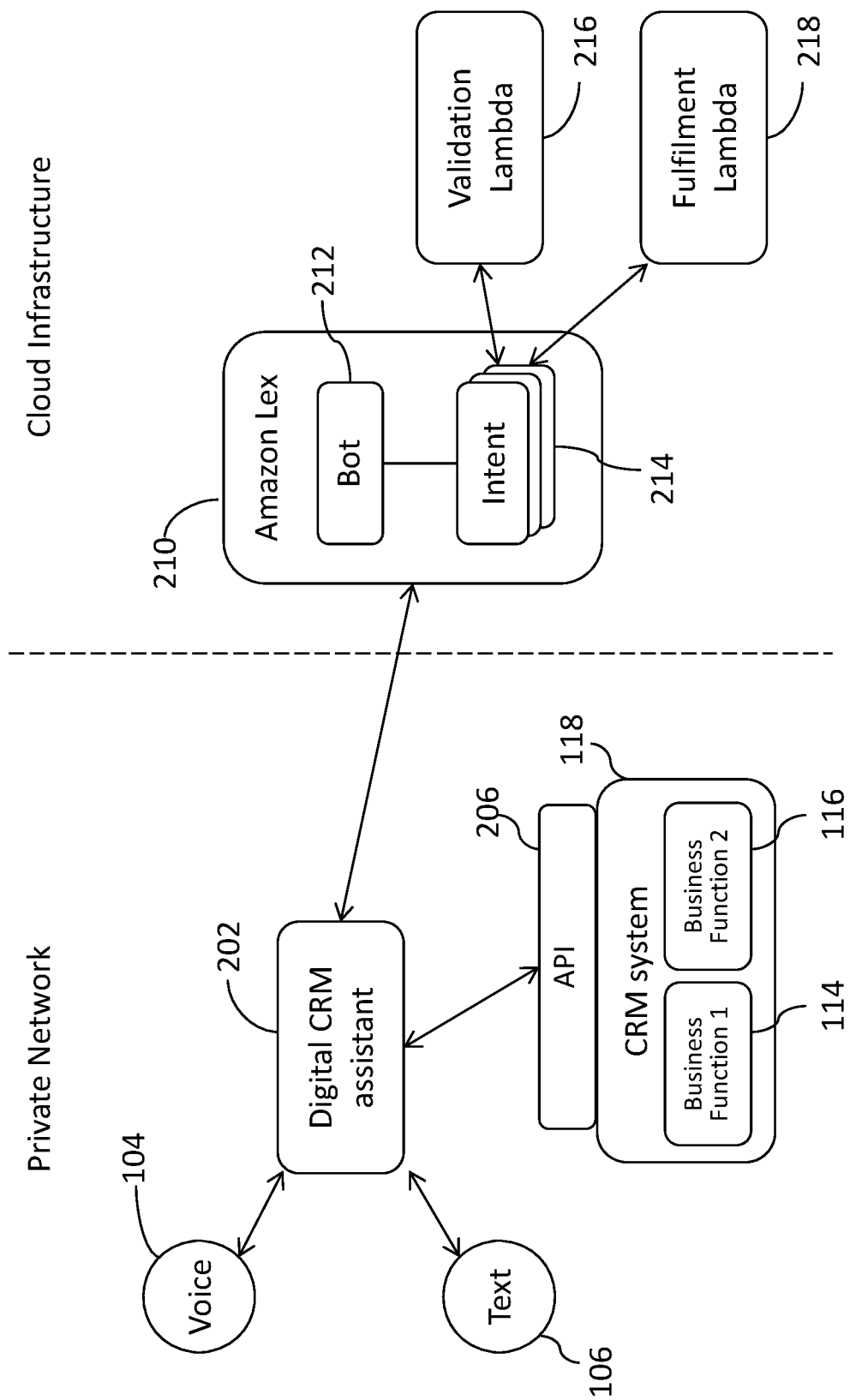
FIG. 2 illustrates an alternative architecture for interaction between a CRM system and a cloud-based chatbot service.

A system in accordance with an embodiment of the invention is illustrated in FIG. 2.

Here, the conversational application is in the form of digital CRM assistant 202. In this example, CRM assistant 202 is a digital assistant for agents who interact with customers (e.g. in a call centre). The CRM assistant is integrated with the CRM system 118 via CRM API 206, and provides a natural language conversational interface to the agents who are dealing with customers' requests. The CRM assistant supports the agent with natural conversations, simplifying the process of interacting with the CRM system and resulting in an improved experience for agents and customers.

The CRM assistant 202 is a web-based app which provides the conversational interface to the user. The app uses Amazon Lex 210 as its external chatbot service.

More specifically, the conversational interface is configured as a "bot" 212 in the Amazon Lex system 210. Each process or operation that is to be performable through the interface is modelled as an "intent" 214 in Lex. For example, intents may include various business functions such as "book appointment", "place order", "update address" etc. These intents map to various CRM/business functions (though not necessarily one-to-one, e.g. fulfilment of an intent could involve invocation of a single corresponding CRM function or multiple related functions). The CRM processes corresponding to an intent are generally referred to herein as a CRM operation, regardless of implementation particulars.

Intents in Amazon Lex are associated with "slots" where each slot corresponds to an item of information to be obtained during the conversational interaction and that is needed to allow the intent to be fulfilled (i.e. for the relevant operation to be successfully performed in the CRM system 118).

Each intent has two hooks—a validation hook 216 and fulfilment hook 218. The hooks are modelled as serverless lambda functions in the Amazon Lex system.

In this architecture, the APIs 206 and business functions 114, 116 of CRM system 118 are not called directly from AWS (Amazon Web Services) lambda functions. Instead, the client CRM assistant application 202 directly calls the APIs instead. As the CRM assistant application runs in the controlled, private network environment of the operator, it can have direct access to the APIs of the operator's business systems.

Figure 3:
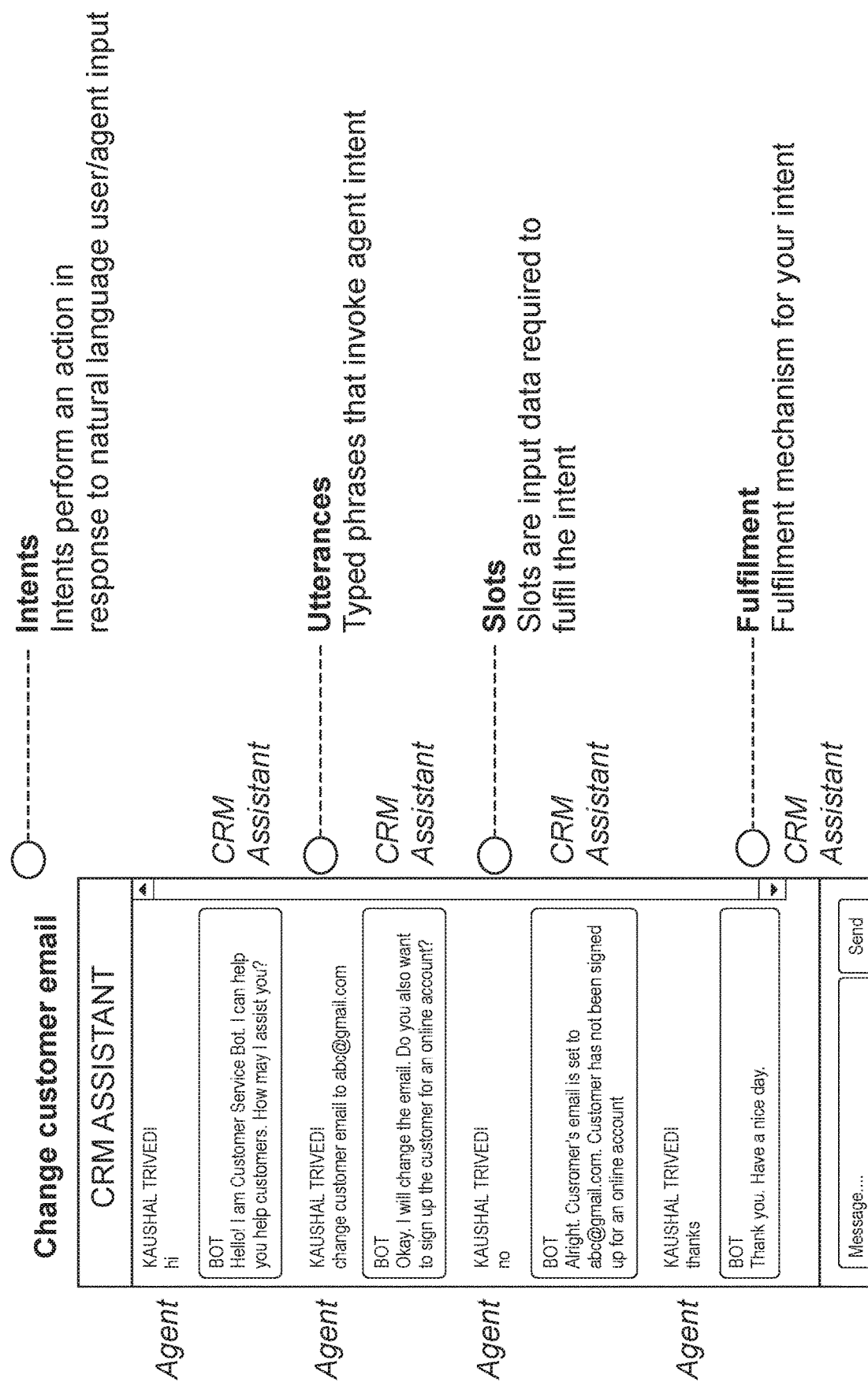
FIG. 3 illustrates an example message exchange conducted through a CRM assistant application.

FIG. 3 illustrates an example conversation between the CRM assistant 202 and the user (e.g. call centre agent). The conversation is associated with a particular intent (here a "change customer email" function) and consists of a sequence of utterances (individual text messages) by the agent (human user) and responses from the digital CRM assistant. During the exchange slots are filled with relevant data (here the slots are the email address for the change and an indication as to whether the user is to be signed up for an online account). Fulfilment is triggered as soon as the CRM assistant has acquired the information for the necessary slots and validation by the validation lambda function confirms the data is valid (e.g. the email address conforms to accepted address syntax). At that point the relevant business function of the CRM system is invoked via the CRM API to perform the change and update the customer's email address.

Data Flow

The following section describes the flow of data within the system. As depicted in FIG. 2, the system consists of four logical components:

1. The Business system—the parent application that hosts application data; in this example the CRM application 118

Figure 4:
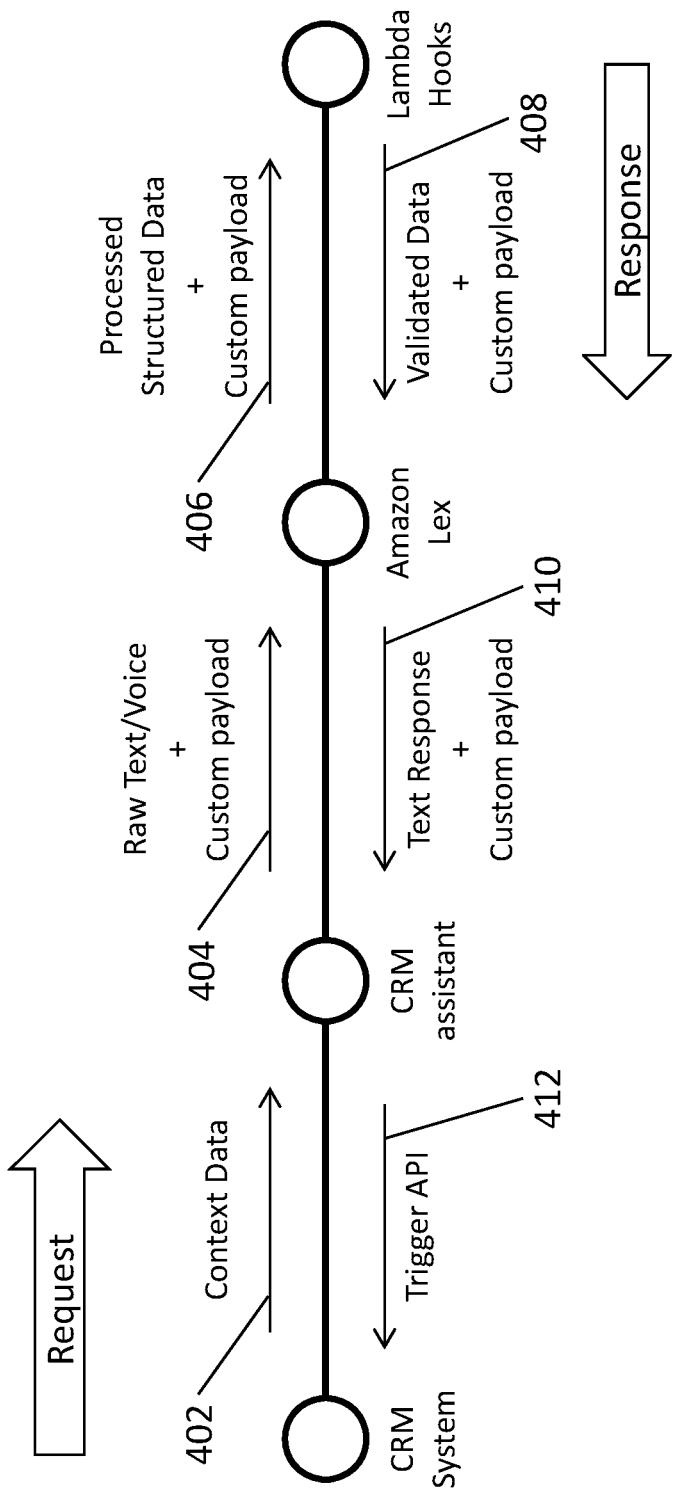
FIG. 4 illustrates a message flow for invoking a CRM operation via a third-party natural language processing system.

2. The digital assistant application 202—the client application that provides text and voice interface to the user
3. Amazon Lex service 210—the AI-based chatbot service
4. Lambda Hooks—The hooks that contain custom validation and fulfilment logic To allow information to be passed between the CRM system and the lambda hooks (beyond the natural language content of the conversational messages themselves), the system adds a custom payload to the data exchanged with the Amazon Lex service. Using this custom payload, the process for carrying out a CRM transaction proceeds as illustrated in FIG. 4:

- The CRM system 118 launches the CRM assistant app 202 and provides it the context to operate within (step 402). In the present case, the context may, for example, be the customer that the agent is dealing with and the account details of the customer (e.g. in the form of a customer identifier and other relevant data)
- The user (agent) uses text input or speech input to converse with the CRM assistant app. The raw text/audio data is passed to Amazon Lex 210 along with the custom payload (step 404).
- Amazon Lex interprets the raw text/speech, identifies the intent and invokes the validation lambda function (hook) 216 associated with the identified intent, passing it the processed structured data and the custom payload received from the CRM assistant app 202 (step 406). The processed structured data consists of the identified intent and the slots (data attributes) extracted so far from the raw natural language messages.
- The lambda function 216 validates the data passed to it and if required, updates the custom payload and the structured data before returning the updated data to Amazon Lex (step 408).
- Invocation of the fulfilment lambda function 218 proceeds analogously, once all necessary slot data has been acquired and validated, the fulfilment lambda function returning a message with the intent/slot data and custom payload where needed.
- Amazon Lex then synthesizes the response text and the updated custom payload and passes the same back to the CRM assistant app (step 410).
- Based on the data in the custom payload the CRM assistant app may invoke one or more APIs in the CRM system 118 (step 412), e.g. for business functions 114/116, and display or speak a response passed by Lex to the user (agent).

Custom Payload

The custom payload allows the lambda hooks to perform the data validation and intent fulfilment without directly invoking the business functions/APIs. The custom payload is modelled as a JSON (JavaScript Object Notation) object and consists of the following components:

i. Intent attributes—Data attributes that are only valid for the lifetime of the current intent. They are supplementary to the slot data extracted by Amazon Lex and can be used to store arbitrary information related to the current intent.

ii. Cross Intent attributes—Similar to the intent attributes but they persist even after the current intent is fulfilled. These attributes allow intents to be chained together by passing data between various intents.

iii. Context data—The data attributes that are derived from the context passed to the CRM assistant by the CRM system. In the present examples, the context data is the customer identifier and associated account data iv. Request name—This attribute is used by the validation lambda function to request for specific additional data from the CRM system. The request name is interpreted by the CRM assistant app, which then in turn invokes the corresponding API from the CRM system to obtain the required data.

v. Request data—any additional input data necessary for executing the API call (e.g. one or more API parameters) in response to the request signalled via the "request name" attribute.

vi. Response data—The data that is fetched by the CRM assistant using CRM API calls based on the request signalled from a lambda function via the "request name" attribute is transmitted back to the requesting lambda function using this attribute.

vii. Custom message payload—The message post fulfilment to be displayed/read out typically depends on the outcome of the fulfilment API invocation, i.e. whether the API call resulted in success or error. The custom message payload contains the following attributes:

a. In-progress message—the message to be displayed while the API invocation is in progress e.g. "booking appointment, please wait".

b. Success message—the message to be displayed if the fulfilment API returns with a success message.

c. Error message—the message to be displayed if the fulfilment API returns with an error message For Amazon Lex the custom payload is passed using the artefact known as "SessionAttributes". However, as indicated elsewhere, the design is platform-agnostic and can be adapted for use on any cloud platform. More generally, the custom payload may be embedded within any one or more custom or session attributes within a message exchanged with the NLP system (the message otherwise being formatted in accordance with the requirements of that system). The custom payload is separate from any natural language content (submitted by a user or generated by the NLP system in response).

The context data and the response data may carry customer data or other sensitive data. For this purpose, these components of the custom payload (or optionally the entire custom payload) are encrypted using asymmetrical cryptography. Further details of the encryption are described in a later section.

The use of an encrypted payload allows the CRM assistant application to pass data to the cloud NLP provider (e.g. Amazon) without the cloud provider being able to interpret/intercept the sensitive data. This is essentially another layer of encryption over the top of TSL/SSL used to encrypt data over the wire (while the cloud provider is of course able to decrypt the transport layer encryption to process the NLP messages, the payload remains encrypted with the inner layer encryption). This removes the need to rely on data protection agreements with the cloud NLP service provider.

The following sections describe in more detail the use of the custom payload in creating and fulfilling a transaction in the context of the "BookNewAppointment" example used earlier. While described in the context of a specific CRM operation for the sake of clarity, it will be understood that the same process can be used for any appropriate transaction or operation that is to be invoked via a natural language interface.

Intent Data & Process Validation

Acquisition and validation of the intent data proceeds as follows:

The user types or says 'can you book me an appointment'.

The CRM assistant app encrypts the customer identifier and customer's account data and sends the same as context data in the custom payload along with the raw text/voice message provided by the user.

Amazon Lex interprets the raw message and understands the intent as 'BookNewAppointment'. The Amazon Lex service will not be able to read the context data in the custom payload as it is encrypted. Thus the sensitive customer data is protected even from the cloud AI provider.

The identified intent and the custom payload are passed to the validation lambda function (validation hook). Note that the custom payload passes through to the lambda function from the CRM assistant without any modification.

The context data is decrypted within the validation lambda function. Note that the logic in the lambda function is completely controlled by the operator and Amazon has no access to the runtime data. So the decrypted context data is still not accessible by the cloud AI provider.

For our appointment example, the validation lambda function will check if the customer is eligible to book an appointment. For this check the data passed in the context data is sufficient. The lambda function checks its eligibility rules against the account data passed in the context data. Note that without our secure custom payload, a typical validation hook at this point would need to invoke a business function/API to get account data. With our custom payload, that step is no longer necessary.

The validation lambda function informs Lex that at this stage the validations are successful and it should prompt the user for the appointment date and time.

Once the user provides the appointment date and time (again via natural language conversation), Lex invokes the validation lambda function with the identified date and time.

The lambda function runs static checks to determine whether the date is a working day and the time falls within the working hours. Once the static checks are successful, it needs to check if the requested appointment slot is free. In this case, the lambda function will require additional data i.e. the list of appointment slots on that given date from the CRM system.

The lambda function uses the custom payload's 'RequestName' attribute to fetch the necessary data via the CRM assistant app. The 'RequestName' is set to 'FetchAppointmentSlots' along with the 'RequestData' attribute being set to the date for which the slots are requested. Note that the content of the RequestData varies according to the 'RequestName' attribute.

As the validation result needs to be deferred in this case until further data is received, the validation lambda function passes a special message to Lex called Confirm Intent. Lex then passes the custom payload containing the 'RequestName' and 'RequestData' to the CRM assistant app.

The CRM assistant app interprets the 'RequestName' attribute' and determines that it needs to invoke a 'FetchAppointmentSlots' function/API from the CRM system. The CRM assistant app calls the API by passing it the data in the 'RequestData' attribute of the custom payload. Note that in this case, no message is displayed to the user. This type of exchange is thus also referred to as a "silent message"—i.e. although the message flows from the Amazon Lex service to the CRM assistant app nothing is displayed to the user and the message is solely sent to instruct the CRM assistant app to fetch further data.

Once the CRM API 206 returns the data, in this case the available free appointment slots, the CRM assistant app encrypts this data and assigns it to the 'ResponseData' attribute of the custom payload. For Amazon Lex, it passes 'yes' as the raw message.

Amazon Lex treats the yes' message as positive response to the Confirm Intent silent message and passes the custom payload and the affirmative response to the validation lambda function.

The validation lambda function decrypts the ResponseData which in this case is the list of available appointment slots. The validation lambda function now has all the data in order to complete its date and time validation. In this case, if the date and time requested by the user matches any of the free appointment slots, the lambda function passes a "validation successful" message to Amazon Lex. The validation lambda function also clears the 'RequestName', RequestData' and 'ResponseData' attributes to keep the custom payload as light as possible.

Amazon Lex identifies that it does not require any further data from the user and all the necessary data for the required slots has been acquired and is confirmed as valid by the validation lambda function (validation hook).

Thus, the "RequestName" and "RequestData" attributes of the custom payload are used by the validation lambda function to invoke a data retrieval function of the CRM (specified in RequestName), optionally with one or more relevant parameters (specified in RequestData). Retrieval itself is performed by the CRM assistant, which has access to the CRM system (unlike the cloud AI/NLP service, i.e. Amazon Lex). The results of the data retrieval operation are returned in the ResponseData attribute of the custom payload (in encrypted form).

By using the combination of encrypted context data in the custom payload and "silent" messages for carrying requests/responses for additional data, the validation hook can successfully carry out detailed validation and data processing without having direct access to the relevant CRM APIs. Additional data required for validation is obtained by signalling requests and responses to/from the CRM system using silent messages with specific attributes set in the custom payload, thus achieving the first objective identified above (the validation hook being able to receive data required for validation without direct access to the CRM system).

Intent Fulfilment

At this point, as described in the earlier section, all the data required for proceeding with booking an appointment has been acquired and validated. Fulfilment then proceeds as follows:

Amazon Lex triggers the second lambda function i.e. the fulfilment lambda function to book an appointment in the appropriate CRM system.

In a typical implementation, this would require the lambda function to be able to call the appropriate business function/API in the business system directly. Then, after the API returns with a success or error message, the lambda function would ask Lex to generate a suitable response message (i.e. success of failure message).

In the present design, however, the fulfilment lambda function does not have access to the CRM APIs and functions. Instead, in the described embodiment the fulfilment lambda function relies upon the CRM assistant app (running within the operator's private network)

to execute the API in order to fulfil the intent, i.e. in this case book an appointment. This is achieved by returning a relevant indication in a fulfilment message transmitted from the fulfilment lambda function back to the CRM assistant. The fulfilment message includes the Amazon Lex intent and slot data, which is used by the CRM assistant to identify the appropriate CRM API operation (corresponding to the intent) and invoke that operation using the relevant parameters (as specified by the slot data).

As the fulfilment lambda (at the point when it is triggered by Amazon Lex) does not yet know the result of the fulfilment API invocation, the system instead synthesizes both the error and success messages in the fulfilment lambda function. The custom message payload is used for this purpose. For our appointment booking example, the customer message payload will comprise three separate response messages:

In-Progress Message—'The appointment is being booked. Please Wait . . . '
Success Message—'The appointment has been booked successfully.'
Error Message—'Sorry, the appointment could not be booked at this time.'

The CRM assistant app intercepts the fulfilment message from Amazon Lex and triggers the CRM API 206 mapped to the fulfilment of the intent. In most cases, the API will be triggered asynchronously so as to not block the application. While the API is being executed, the In-Progress message is displayed to the user on the screen.

Once the CRM API call returns, the In-Progress message is replaced either by the success or failure message, depending on a success/failure indication returned by the CRM API.

The described approach achieves the second objective set out above, i.e. the fulfilment hook being able to trigger fulfilment without connecting directly to the business functions/APIs. Furthermore, provision of the in-progress, success and error messages at the same time in the message sent by the fulfilment lambda function avoids an additional message roundtrip between the CRM assistant app and the validation lambda functions.

Secure Communication

All the data flows occur using TLS-SSL HTTPS (secure hypertext transfer protocol using Transport Layer Security/Secure Sockets Layer) so that the data is encrypted over the wire. This ensures that the data is not accessed by any unauthorised party.

However some parts of our custom payload contain sensitive or customer data that we do not even want our cloud provider to be able to access. Preferred embodiments use AES-256 public key encryption to encrypt context data and response data components of the custom payload (in general any or all of the custom payload may be encrypted depending on requirements). The public key encryption consists of a pair of keys, a public key for encryption and a corresponding private key for decryption.

The private key is stored securely using Amazon KMS service. AWS Key Management Service (AWS KMS) is a managed service that allows us to create and control the encryption keys. The master keys that are created in AWS KMS are protected by FIPS 140-2 validated cryptographic modules. Only the validation/fulfilment lambda functions have the authorisation the use the private key stored in AWS KMS.

The CRM assistant app holds the public key which it uses to encrypt the above mentioned components of the custom payload (e.g. context data and response data generated in response to a data query received from a validation lambda function). Once the data is encrypted, Amazon Lex or any other AWS service will not be able to read these components of the custom payload. This secures the sensitive data that flows through the cloud provider backbone.

The relevant lambda function decrypts the custom payload using the private key stored in the AWS KMS service. Note that Amazon does not have access to the runtime data for the lambda function and hence the decrypted data is never exposed, not even to the trusted cloud AI/NLP provider.

This approach therefore meets the third objective identified above, i.e. the context data passed through the AI chatbot service being encrypted so that it cannot be utilised or accessed by the cloud provider in any way.

As a further security feature, in one embodiment the CRM assistant is configured to detect certain sensitive information within the text of messages input by a user and to prevent that information from being transmitted to Amazon Lex. To this end, the CRM assistant may pre-parse messages to detect certain types of information (e.g. credit card or bank account numbers) and may suppress such information either by masking the information (deleting the relevant characters or substituting them with a placeholder prior to transmission), or by simply not sending the message to Amazon Lex at all.

Due to the nature of the client side integration of the CRM assistant, the operator has full control over the data that is passed to Amazon Lex (both in the message text content and custom payload). Only data that will be required by Lex to execute data validations is preferably passed in the custom payload.

CRM Integration

In the above examples, the CRM assistant provides a natural-language interface to a CRM system.

Figure 5:
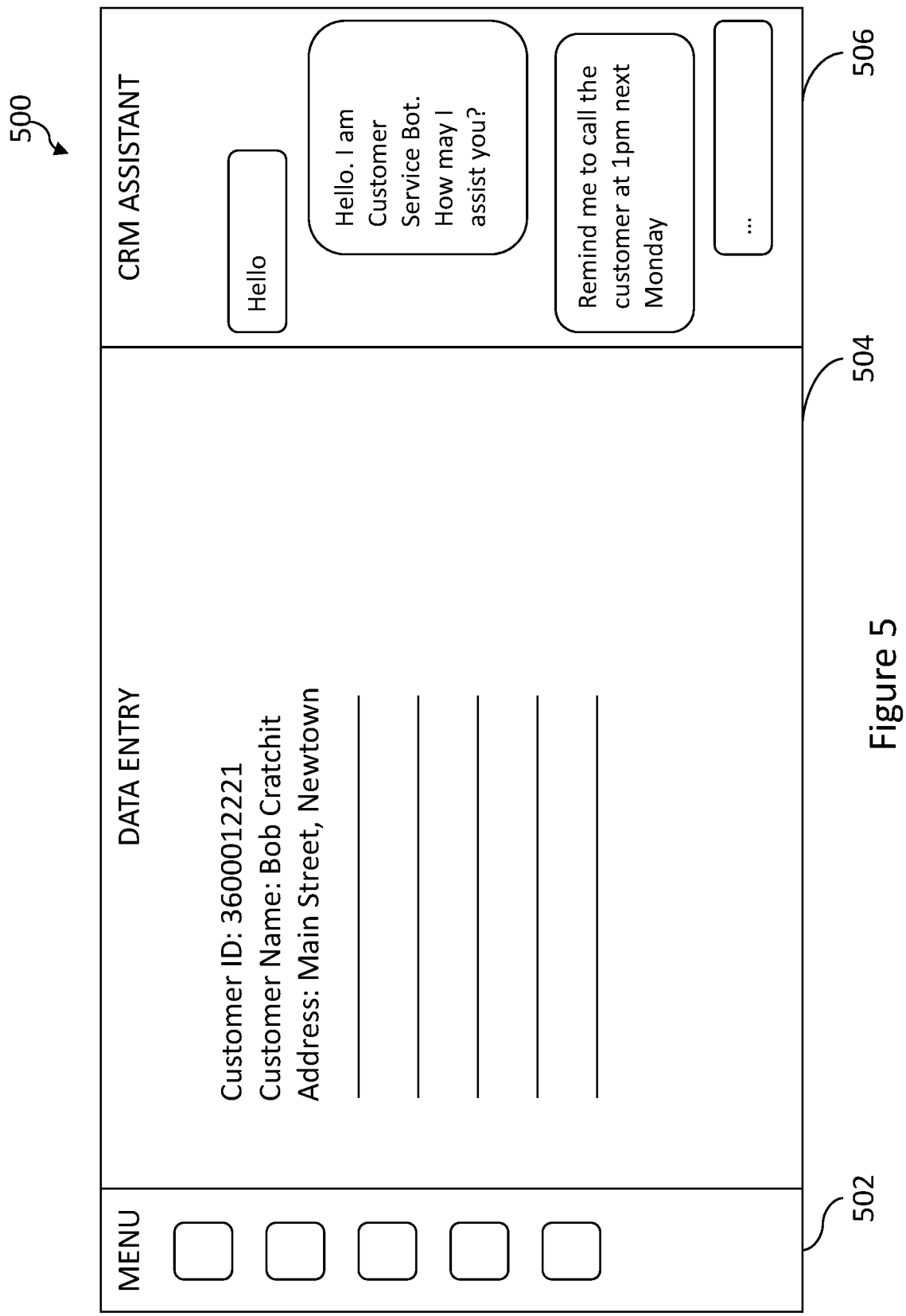
FIG. 5 illustrates integration of a CRM assistant into a CRM user interface.

In a preferred embodiment, the CRM assistant is directly integrated into a user interface of the CRM system, for example a call centre agent workbench application. This is illustrated in FIG. 5. Here, the call centre agent workbench 500 is a CRM interface allowing the call centre agent to carry out various CRM functions in a conventional way, e.g. using mouse/keyboard input of data into structured data entry screens etc.

In this simplified example, the interface includes a menu 502 and a data entry panel 504. Additionally, a chat interface 506 of the CRM assistant is displayed alongside other interface components (this may resemble an instant messaging app, as depicted in FIG. 3). The chat interface can be integrated into the workbench as a permanent element or alternatively can be selectively activated by the agent. The CRM context is determined by a customer record currently displayed in the main data entry panel 504 (e.g. this may have been identified at the start of a customer service call by the call centre agent). The customer ID, and optionally other relevant context information relating to that customer, is provided to the CRM assistant, and supplied from there to the other system components together with any messages typed by the agent, using the custom payload as described previously. While a text interface is illustrated, a voice interface may be provided in addition to, or instead of, the text interface.

The integrated approach allows certain tasks that would ordinarily be implemented via CRM interface workflows to be performed instead using the conversational interface of the CRM assistant, which can simplify agent interactions and improve quality of service. For example, for an energy provider, examples of functions that could be implemented by the CRM assistant could include:

- changing customer phone details
- changing customer email address
- registering a customer for an online account
- helping the agent to book callbacks (e.g. simply typing "remind me to call customer next Monday noon", rather than existing processes requiring the agent to leave the current screen and click through multiple other screens, date pickers etc.)
- providing best tariff information (saving the agent the time for working out a best tariff for a customer)
- home moving (i.e. transferring a customer account to a new address, with the chatbot interaction establishing date and address details for the move)

Furthermore, the described architecture allows new functionality to be added quickly and transparently by implementing new intents and associated validation/fulfilment lambdas in Amazon Lex.

Although in these examples, the CRM assistant is integrated into a user interface for use by a call centre agent, the CRM assistant could alternatively be provided directly to the end user (e.g. business customer), e.g. via a web application. As a further example, the CRM assistant could be integrated into third-party services, for example as a messaging bot within Facebook or Twitter.

Detailed Message Flow Example

A further message flow example is illustrated in FIGS. 6A-6F.

Figure 6A:
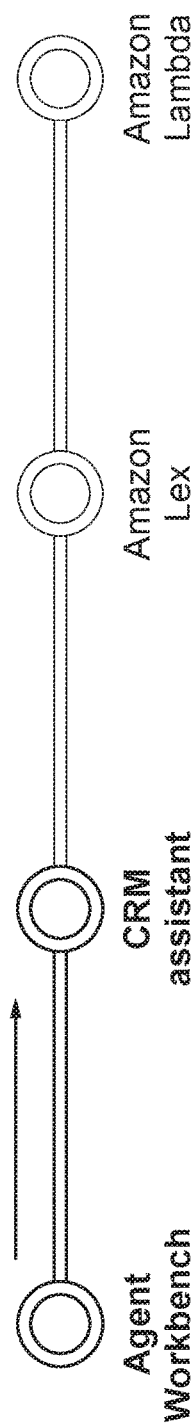
FIGS. 6A-6F provide a further detailed message flow example.

In this example, the CRM assistant is being used to book a customer callback. FIG. 6A illustrates provision of the context data from the agent workbench to the CRM assistant. Here, the context data is just a customer identifier, corresponding to a customer record currently being viewed in the CRM agent workbench.

Figure 6B:
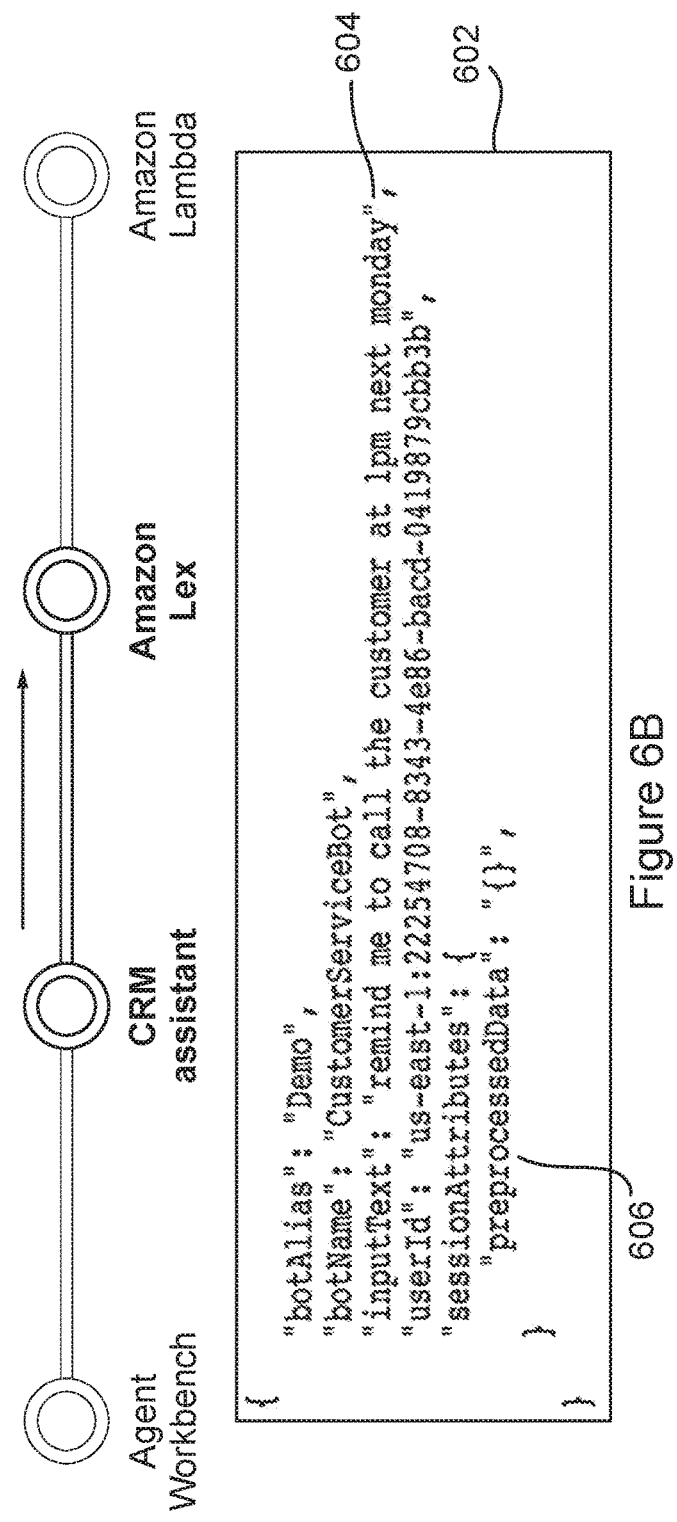

FIG. 6B illustrates a message sent from the CRM assistant to the Amazon Lex service after the user typed the message "remind me to call the customer at 1 pm next Monday". The JSON message encoding is shown at 602, containing the original message text 604, and the custom payload 606 encoded in the "sessionAttributes" field (currently not containing any data).

Figure 6C:
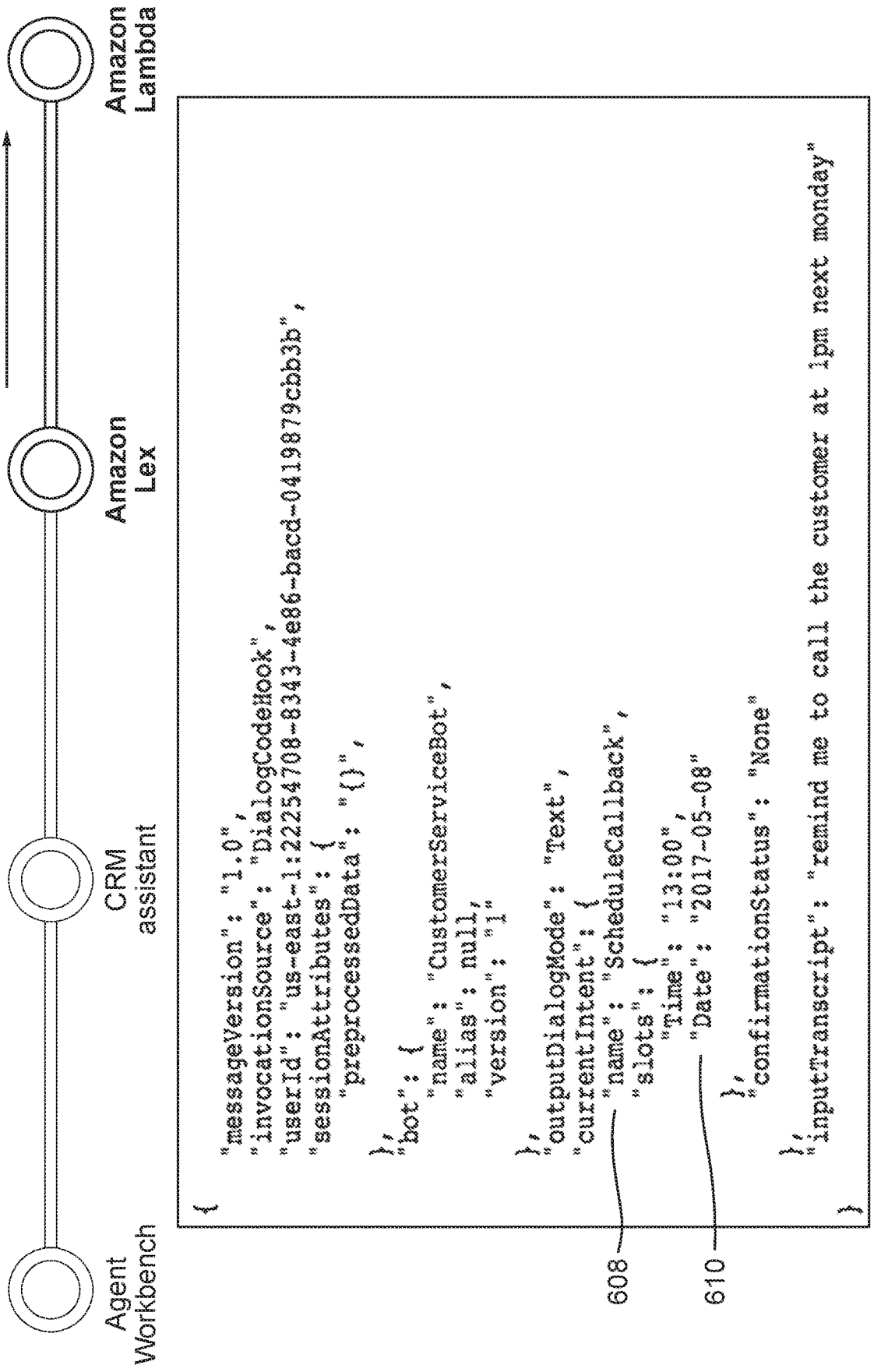

FIG. 6C illustrates the message after processing by Amazon Lex. Lex has identified the intent and annotated the message with information including the name 608 and populated slots 610 for the identified intent. The slots are the information elements required for the intent, here the time and date for the intended callback. The message is sent to the validation lambda.

Figure 6D:
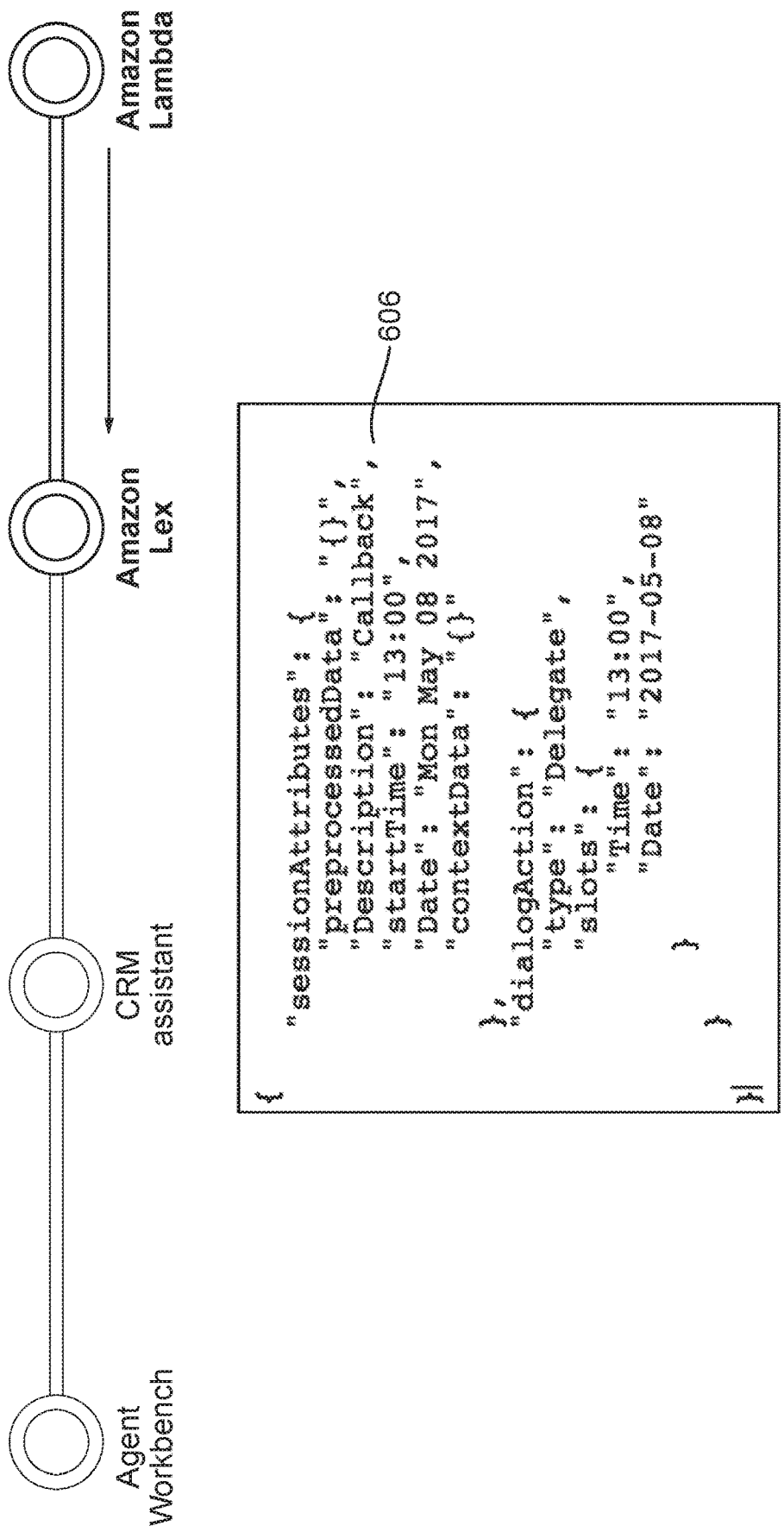

FIG. 6D illustrates a corresponding message after processing by the validation lambda. Relevant information has been added to the payload 606 (embedded as the "sessionAttributes" field).

Figure 6E:
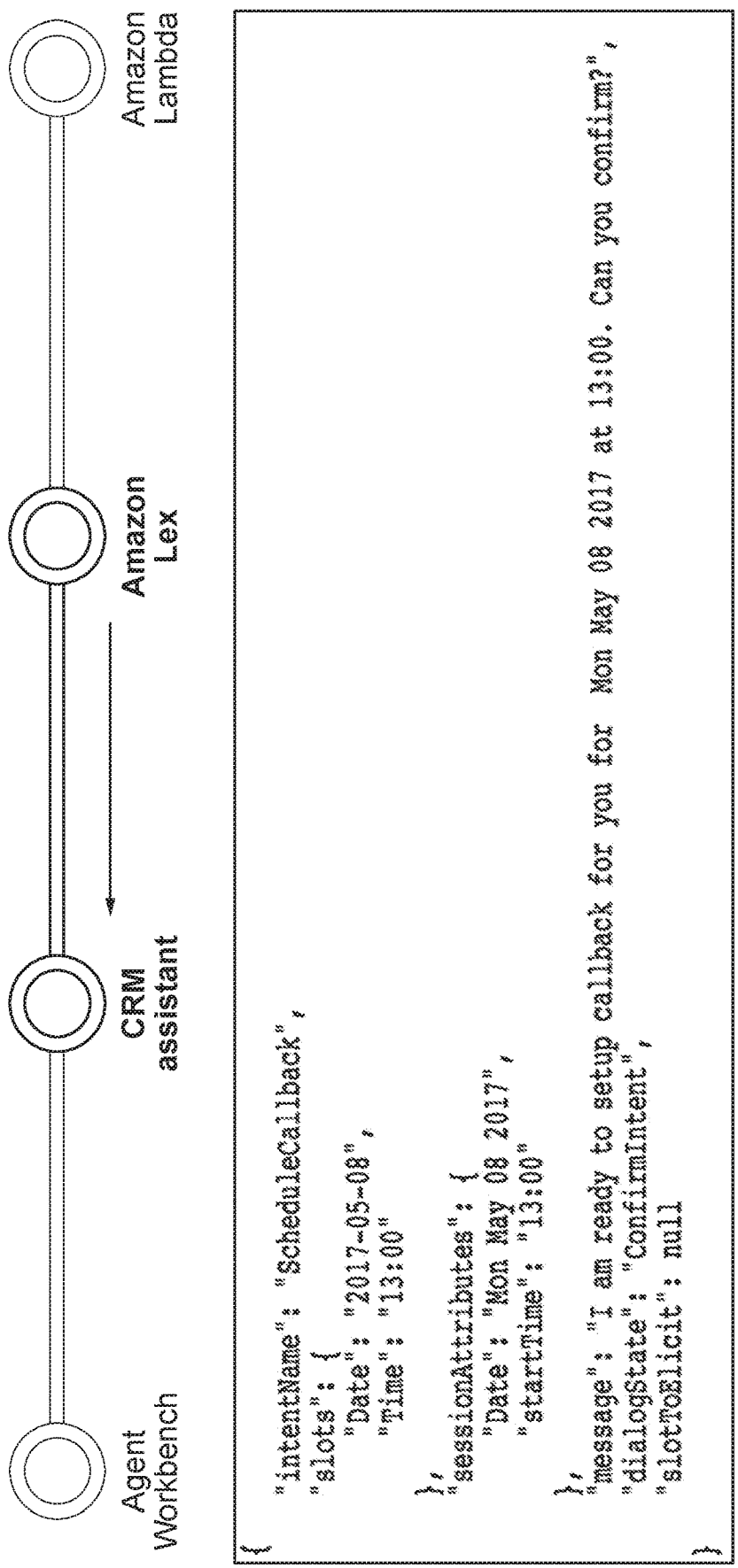
Figure 6F:
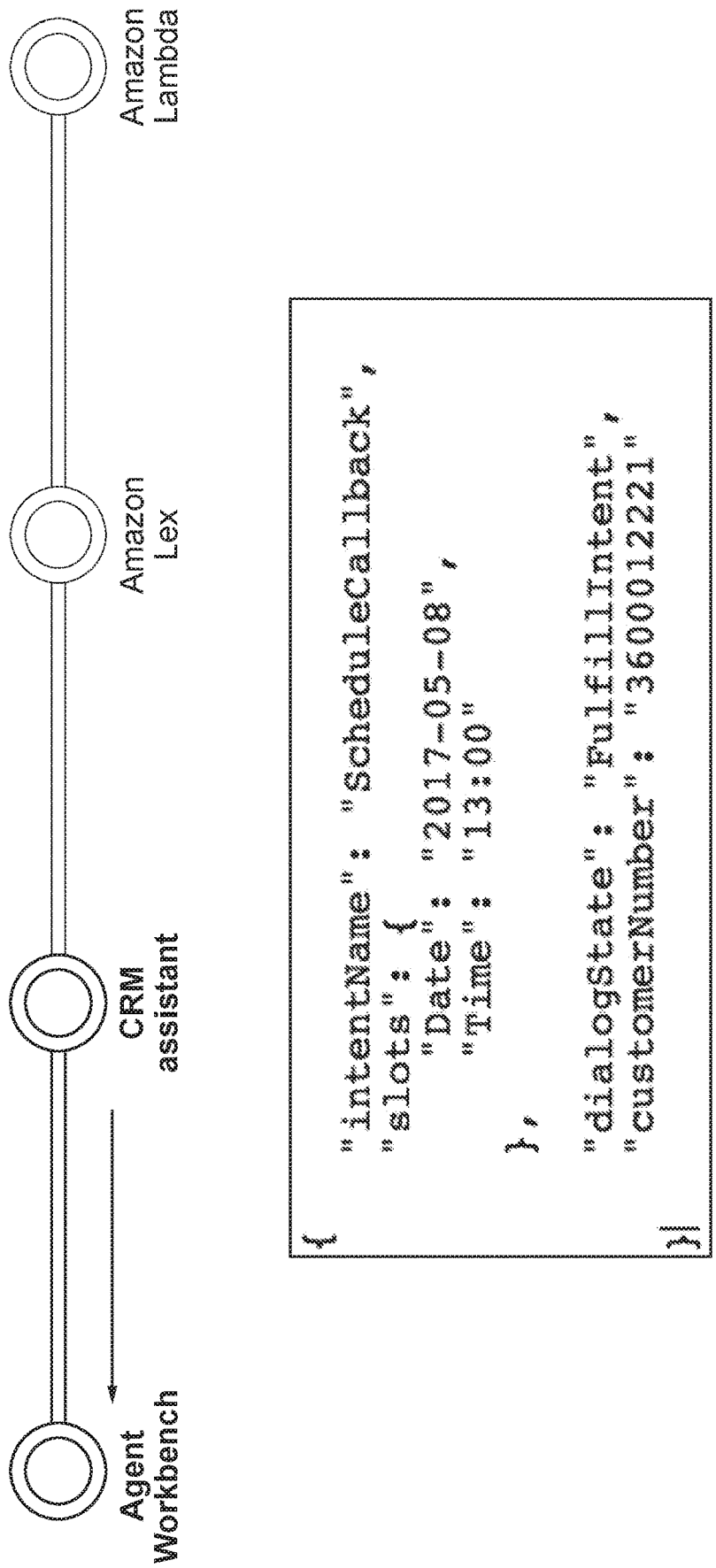

FIG. 6E illustrates a subsequent message sent back to the CRM agent by Amazon Lex to confirm the intent, i.e. to confirm that the relevant CRM operation should be carried out. FIG. 6F illustrates a corresponding message sent from the CRM assistant back to the agent workbench to confirm the operation. In response, the agent workbench invokes the relevant CRM API function to schedule the callback as requested. The operation is specified by way of the intent name and slot data extracted by Lex, with the agent workbench application identifying the relevant fulfilment logic and API calls to implement the required operation. Alternatively, the CRM assistant could map the Lex intent name and slot data to a corresponding CRM operation and signal the CRM operation to the agent workbench application, or invoke the relevant CRM APIs directly.

Note that in the example of FIGS. 6A-6F, fulfilment occurs automatically after validation of the intent data. This may be appropriate for simpler cases, for example where the relevant information is provided in a single message to the CRM assistant. More complex examples, requiring conversational interactions between the agent and CRM assistant, would instead be implemented using separate validation and fulfilment lambdas in a multi-stage process as previously described. However, similar message representations may be employed in either case.

Implementation Details

In an example embodiment, the CRM workbench is implemented as an HTML5 web application client using restful APIs. The CRM system is an SAP or similar system. The chat interface component of the CRM assistant is itself implemented as an HTML5 based messenger app.

While the CRM assistant is described above as being implemented within the controlled private network associated with the system operator, in other embodiments a cloud-based implementation is possible (e.g. hosted in Amazon S3). Nevertheless, such an implementation would be separate from the Amazon Lex service, and the data handled would not be accessible to the cloud NLP provider. In one example, the application integrates with Amazon Cognito for user authentication purposes, enabling the app to authenticate agents with Active directory through SAML. Once authenticated, the agent is provided with temporary security credentials to access services such as Lex and DynamoDB. The latter is a NoSql database service which may be used by the system to store session data (e.g. to allow data to be passed between multiple intents) and configuration data (e.g. help text for intents that can be used as a guide for agents).

Figure 7:
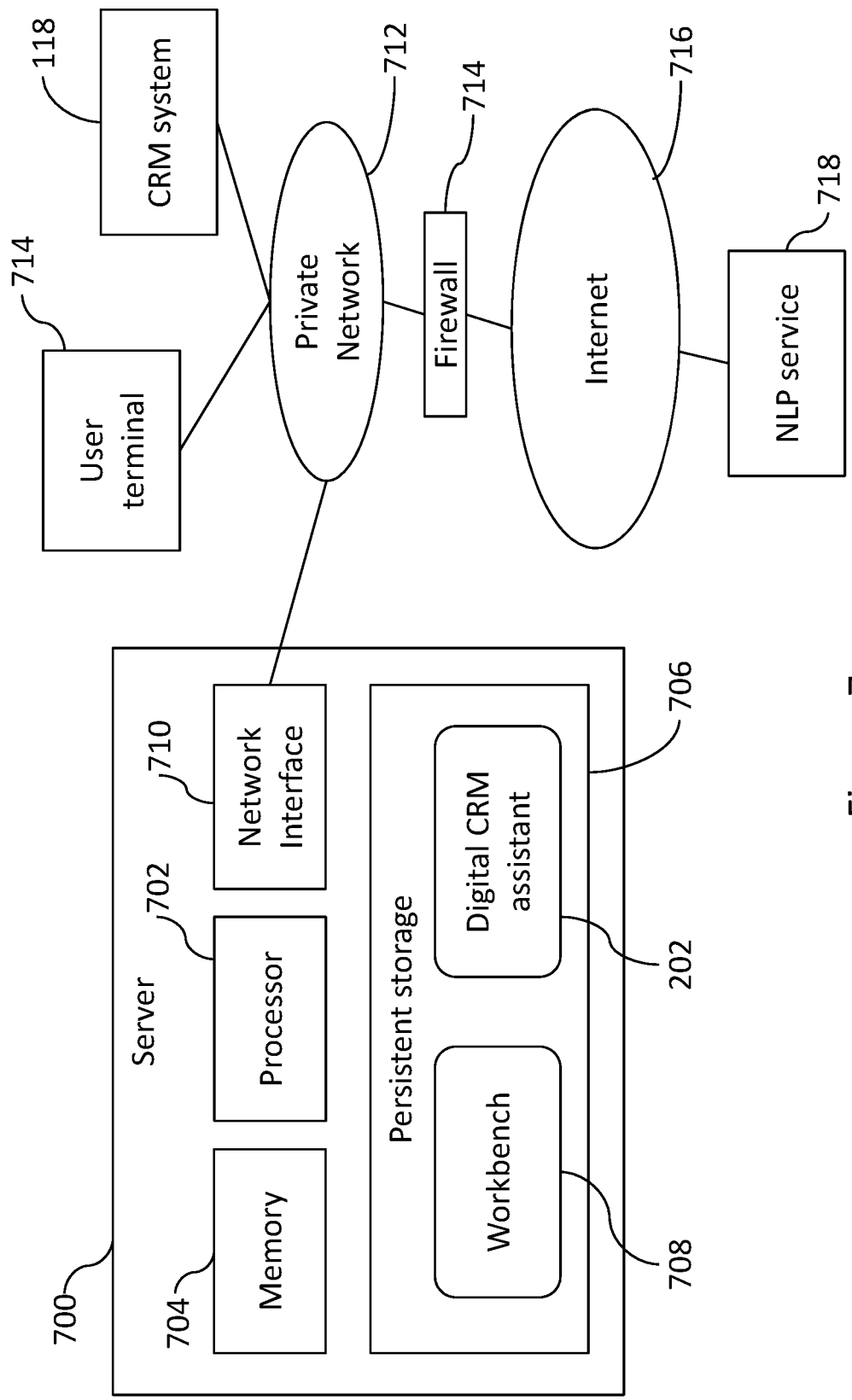
FIG. 7 illustrates a computer system for implementing described techniques.

An example computer system for implementing a CRM assistant is illustrated in FIG. 7. The system includes a server 700 for providing the CRM assistant as a web application (e.g. alongside the workbench application). The server includes one or more processors 702 together with volatile/random access memory 704 for storing temporary data and software code being executed.

Persistent storage 706 (e.g. in the form of hard disk storage, optical storage and the like) persistently stores software for performing various described functions, including the agent workbench interface 708, and the CRM assistant module 202. The persistent storage also includes other server software and data (not shown), such as a server operating system.

A network interface 710 is provided for communication with other system components over a private network 712. In particular, the server connects via the network to one or more user terminals 714, from which agents access the workbench application 708 and CRM assistant application 202, and to the CRM system 118. The private network is connected via a firewall 714 to a public network 716, in particular the Internet, hosting the remote third-party natural language processing service 718 (e.g. the Amazon Lex service), thereby allowing the device 700 to interact with the eternal NLP service.

The server will typically include other conventional hardware and software components as known to those skilled in the art.

While a specific architecture is shown by way of example and specific software technologies and vendors have been mentioned, any appropriate hardware/software architecture may be employed.

Functional components indicated as separate may be combined and vice versa. For example, the functions of server 700 may in practice be implemented by multiple separate server devices, e.g. by a cluster of servers. For example, the workbench and CRM assistant components may be hosted on different server devices. The CRM system 118 and the server 700 may also be integrated within a single server or server cluster.

Figure 8:
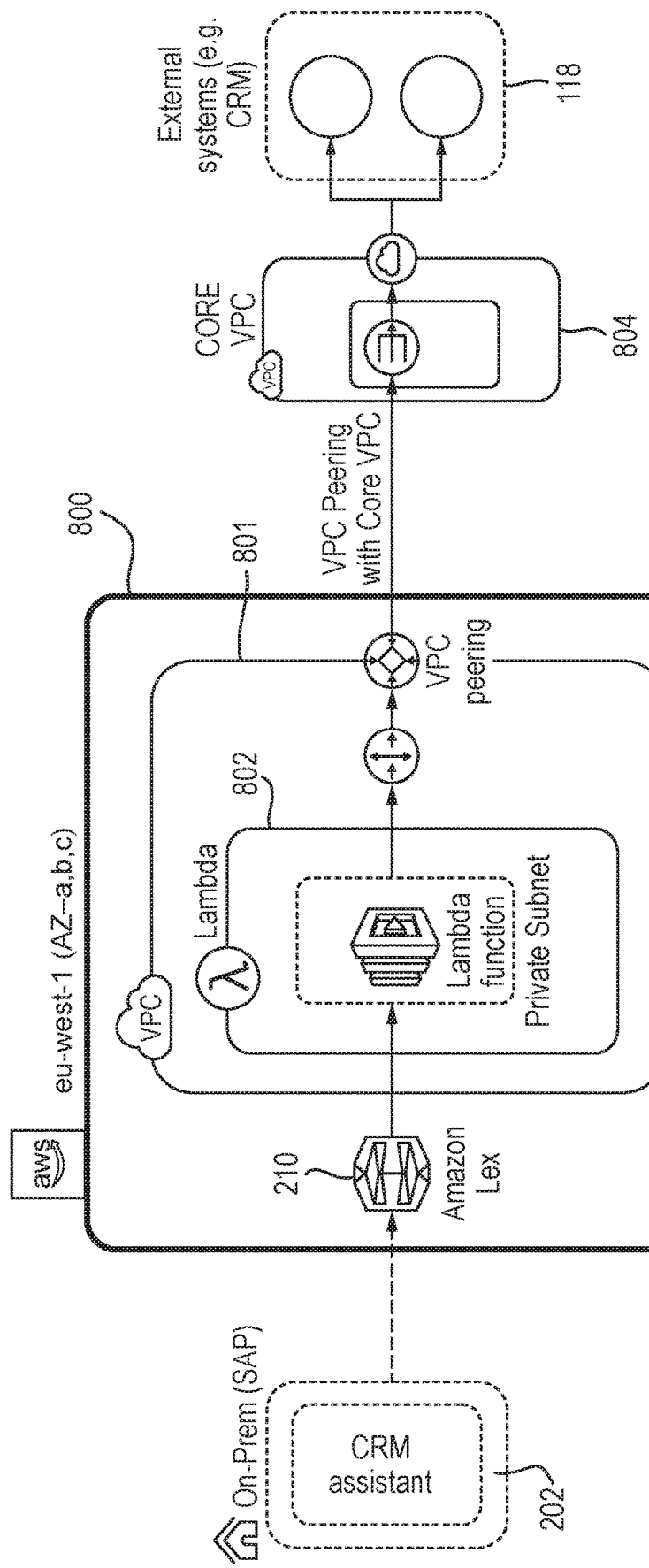
FIG. 8 illustrates a further approach for integrating a cloud-based chatbot service with a CRM system.

A further embodiment of a system that integrates a public cloud based natural language processing system with a private CRM system is illustrated in FIG. 8. In this example, the architecture is modified so that invocation of the CRM system 118 does not occur via the digital CRM assistant 202 but instead is performed directly by the lambda functions.

Thus, in this arrangement, the digital CRM assistant 202 receives voice/text input as before and provides this to the Amazon Lex service 210 (or other cloud-based NLP system). As described previously, the Amazon Lex service identifies intents and slot data (typically corresponding to operations to be performed and parameters for the operations) from the natural language exchanges and passes this information to validation/fulfilment lambda function(s) 802. As previously described, these functions may be embodied in a single lambda function or as separate validation/fulfilment lambda functions depending on complexity of the particular use case. As described, context data (e.g. relating to a customer, such as a customer ID and/or other information relevant to the operation) is passed in an encrypted custom payload of the messages sent to Amazon Lex, which passes the encrypted payload to the lambda functions. Amazon Lex itself does not have access to the decryption keys and is unable to decrypt and access the contents of the encrypted custom payload.

The lambda functions 802 are implemented within a virtual private cloud (VPC) environment 801 implemented within the wider Amazon Web Services cloud 800. This VPC environment provides a protected processing/network domain and is under control of the CRM system operator (who configures the lambda functions to implement the required processing logic required for the CRM operations) and not accessible by Amazon Lex, other systems in cloud 800, or external systems/entities. The lambda functions 802 are configured to run within the VPC environment and are provided access to the relevant decryption key(s) to allow decryption of the custom payloads. Thus, on receipt of encrypted custom payload data from Amazon Lex, the lambda function(s) access the decryption key, decrypt the custom payload and use the data contained therein for validation and/or fulfilment, as described previously. This may involve:

- using data from the decrypted custom payload to validate slot data extracted from the natural language messages; and/or
- providing data from the decrypted custom payload and/or the slot data to the CRM system, e.g. as parameter(s) of the operation to be performed—for example, an email address update for a customer may include a customer identifier from the encrypted custom payload (which may have been originally provided as context data at the start of the natural language exchange), and a new email address extracted from the natural language content as slot data for the intent by Amazon Lex, with both the customer identifier and the new email address provided as parameters to an "update customer email" operation at the CRM system.

However, in the arrangement shown in FIG. 8, the invocation of the CRM operation corresponding to the identified intent does not occur via embedding of information defining the required operation into the message stream flowing back to the Digital CRM assistant 202, as in previously described examples. Instead, CRM operations are invoked directly by the lambda functions(s), where "directly" in this case denotes that invocation does not occur via Amazon Lex 210 and Digital CRM assistant 202. Invocation occurs via one or more messages sent to (or exchanged with) the CRM systems 118, e.g. to invoke a suitable API function of the CRM systems. In this example, the message(s) travel via a second core VPC that interfaces to the CRM systems, but other arrangements are possible.

Although in this case, the lambda functions thus call the CRM systems directly to invoke CRM operations (such as updates of customer data), the sensitive data remains secure and inaccessible to the NLP service provider (e.g. Amazon) and third parties, as it is provided to the lambda functions embedded within the encrypted custom payload, and can only be decrypted by the lambda functions, which run within a VPC environment controlled by the CRM operator.

Note that, while this diagram shows the Digital CRM assistant 202 on the left, ostensibly separate from the CRM systems 118 on the right, this is for illustrative purposes to emphasise the information flow. In reality, the Digital CRM assistant 202 and CRM systems 118 could be located within the same private network/system as each other, as in previously described examples. For example, with reference to FIG. 2, the system architecture could be as depicted there, but with a further message channel for invocation of CRM operations from lambda functions 216/218 directly to CRM system 118, bypassing Amazon Lex 210 and the CRM assistant 202. Alternatively, in this approach, the CRM assistant 202 and CRM systems 118 could indeed be located in entirely separate network domains/systems, that may not be directly accessible to each other.

Although in this approach CRM invocation is direct, all other aspects of the previously described information flows may still be employed in this arrangement. In one example, once the lambda function has invoked an operation at a CRM system (e.g. by performing an API action), it confirms completion of the operation/CRM call via a confirmatory message sent back via the NLP service (Lex) through to the digital CRM assistant/workbench (e.g. using a natural language message to be displayed or spoken), using the messaging processes described previously. As a further example, if additional information is needed by the lambda function, a request can be sent to the digital CRM assistant/workbench with a response received via the custom payload using the messaging processes described previously (e.g. using "silent" messages).

It will be understood that the present invention has been described above purely by way of example, and modification of detail can be made within the scope of the invention.

The invention claimed is:

1. A data processing system comprising:
    a data management system located in a first network, the data management system providing operations for modifying data stored by the data management system; and
    a natural language processing system for processing natural language messages used for invoking operations of the data management system;
    wherein the natural language processing system is located outside the first network; the data processing system further comprising:
    an interface application having access to the data management system, the interface application adapted to:

receive one or more natural language messages from a user;

forward the natural language messages to the natural language processing system for processing, wherein the interface application is arranged to forward a natural language message received from a user as a formatted message, and to include context data in a payload of the formatted message;

receive an invocation message from the natural language processing system, the invocation message comprising operation data defining an operation to be performed at the data management system, the operation identified by the natural language processing system based on the one or more natural language messages, wherein the natural language processing system is arranged to use the context data for at least one of: validating operation parameters obtained from the natural language message(s), and generating the invocation message; and invoke the operation at the data management system based on the operation data;

and wherein the system is adapted to encrypt data in a payload of one or more of: the formatted natural language message, the invocation message, a request message sent from the natural language processing system to the interface application, and a response message sent by the interface application to the natural language processing system, the encrypted data including one or more of: the context data supplied by the interface application, and requested data obtained and sent by the interface application in the response message responsive to the request message.

2. A system according to claim 1, wherein the natural language processing system is not able to invoke the operation specified in the invocation message, or a plurality of operations specifiable in invocation messages, directly, or wherein the natural language processing system is not able to invoke any operation of the data management system directly.

3. A system according to claim 1, wherein the natural language processing system is arranged to identify at least one of:
   one of a plurality of predefined intents for a natural language exchange comprising the one or more natural language messages, wherein the operation to be performed is determined based on the identified intent;
   one or more parameters for the operation based on the natural language messages(s).

4. A system according to claim 1, wherein the operation data comprises one or more of:
   an identifier of the operation or of an intent corresponding to the operation, and
   one or more operation parameters,
   wherein the identifier and parameters having been inserted in the invocation message by the natural language processing system based on the natural language message(s).

5. A system according to claim 1, wherein the interface application is arranged to run within the first network.

6. A system according to claim 1, the interface application arranged to receive the request message from the natural language processing system, the request message comprising a payload with request data defining data to be obtained from the data management system, the interface application arranged to acquire requested data from the data management system based on the request data, and to transmit the response message to the natural language processing system having a payload containing the requested data, preferably wherein no natural language output is generated at the interface application responsive to the request message.

7. A system according to claim 6, wherein at least one of:
   the request and/or response message are formatted in accordance with a standard message format of the natural language processing system but preferably contain no natural language content to be processed by the natural language system or output to a user
   the request message is generated by a validation function defined in the natural language processing system, the validation function adapted to validate operation parameters supplied via the natural language message(s), and wherein the requested data is used by the validation function for validating the operation parameters.

8. A system according to claim 1, wherein the invocation message is generated by a fulfilment function defined in the natural language processing system, wherein the natural language processing system is arranged to invoke the fulfilment function after identifying required operation parameters through the natural language exchange, preferably wherein the required operation parameters correspond to slots of an intent identified from the natural language messages by the natural language processing system, the intent corresponding to the operation.

9. A system according to claim 1, wherein the encrypted data is decryptable only by one or more custom functions added to the natural language processing system for processing natural language exchanges relating to the data management system, and is not decryptable by other parts of the natural language processing system.

10. A system according to claim 9, wherein the one or more custom functions comprise at least one of:
   One or more custom functions provided by an operator of the data management system, configured to have access to a decryption key used for decrypting the encrypted data;
   a validation function for validating an intent;
   a fulfilment function for fulfilling an intent.

11. A system according to claim 1, wherein the encryption is at least one of:
   applied only to a subset of the message(s) and preferably not to any natural language content of the message(s)
   separate from and additional to a second encryption applied to the message(s) for transport over a network.

12. A system according to claim 1, wherein payload(s) of the formatted messages, request message, response message and/or invocation messages are separate from any natural language content of said message(s) intended for processing by or generated by the natural language processing system, wherein the payload comprises one or more custom attribute(s) or session attribute(s) of said message(s).

13. A system according to claim 1, wherein the interface application is further arranged to prevent sensitive information from being transmitted to the natural language processing system, wherein the interface application is arranged to identify an item of potentially sensitive information, for example an account identifier, in a natural language message received from a user, and to prevent transmission of the message to the natural language processing system or to remove the information from the natural language message prior to transmission to the natural language processing system.

14. A system according to claim 1, further comprising a data management interface application providing a data management interface for enabling a user to interact with the data management system, wherein the interface application is integrated into the data management interface application, wherein the data management interface application is adapted to provide data associated with a currently displayed data record to the interface application as context data for transmission to the natural language processing system.

15. A system according to claim 1, wherein natural language messages comprise one or both of: text data, and voice data; wherein the interface application preferably comprises a user interface for receiving input of text messages from a user for transmission to the natural language processing system and for outputting text message responses received from the natural language processing system to the user.

16. A non-transitory computer readable medium comprising instructions for execution by a data management system located in a first network, the data management system providing operations for modifying data stored by the data management system, the instructions comprising:

instructions for providing an interface application having access to the data management system and configured for processing natural language messages used for invoking operations of the data management system, the instructions configured to:

receive one or more natural language messages from a user;

forward the natural language messages to a natural language processing system for processing, wherein the natural language processing system is located outside the first network, wherein the interface application is arranged to forward a natural language message received from a user as a formatted message, and to include context data in a payload of the formatted message;

receive an invocation message from the natural language processing system, the invocation message comprising operation data defining an operation to be performed at the data management system, the operation identified by the natural language processing system based on the one or more natural language messages, wherein the natural language processing system is arranged to use the context data for at least one of: validating operation parameters obtained from the natural language message(s), and generating the invocation message; and invoke the operation at the data management system based on the operation data;

and further comprising instructions configured to encrypt data in a payload of one or more of: the formatted natural language message, the invocation message, a request message sent from the natural language processing system to the interface application, and a response message sent by the interface application to the natural language processing system, the encrypted data including one or more of: the context data supplied by the interface application, and requested data obtained and sent by the interface application in the response message responsive to the request message.

17. A method performed in a system comprising an interface application in communication with a data management system located in a first network, the data management system providing operations for modifying data stored by the data management system, the interface application having access to the data management system and configured for processing natural language messages used for invoking operations of the data management system, the method comprising:

receiving one or more natural language messages from a user;

forwarding the natural language messages to a natural language processing system for processing, wherein the natural language processing system is located outside the first network, the forwarding comprising forwarding a natural language message received from a user as a formatted message, and including context data in a payload of the formatted message;

receiving an invocation message from the natural language processing system, the invocation message comprising operation data defining an operation to be performed at the data management system, the operation identified by the natural language processing system based on the one or more natural language messages, wherein the natural language processing system uses the context data for at least one of: validating operation parameters obtained from the natural language message(s), and generating the invocation message; and invoking the operation at the data management system based on the operation data;

wherein the method further comprises encrypting data in a payload of one or more of: the formatted natural language message, the invocation message, a request message sent from the natural language processing system to the interface application, and a response message sent by the interface application to the natural language processing system, the encrypted data including one or more of: the context data supplied by the interface application, and requested data obtained and sent by the interface application in the response message responsive to the request message.

* * * * *